United States Patent
Bergmann et al.

[11] Patent Number: 5,941,953
[45] Date of Patent: Aug. 24, 1999

[54] METHOD FOR SIMULTANEOUS DIGITAL PROCESSING OF A PLURALITY OF AUDIO VISUAL DATA PACKETS BY USING DATA, EVENT, PROTOCOL AND ENDPOINT MODULES

[75] Inventors: Johannes Bergmann, Tutzing; Michael Geiger, München, both of Germany

[73] Assignee: Siemens Aktiengesellschaft, Munich, Germany

[21] Appl. No.: 08/793,187

[22] PCT Filed: Aug. 21, 1995

[86] PCT No.: PCT/DE95/01101

§ 371 Date: Feb. 21, 1997

§ 102(e) Date: Feb. 21, 1997

[87] PCT Pub. No.: WO96/06399

PCT Pub. Date: Feb. 29, 1996

[30] Foreign Application Priority Data

Aug. 25, 1994 [DE] Germany .............................. 44 30 247

[51] Int. Cl.$^6$ ...................................................... G06F 15/16
[52] U.S. Cl. .......................... 709/234; 709/233; 709/231; 712/225; 707/10; 707/104
[58] Field of Search ................................ 395/500, 200.61, 395/200.45, 200.31, 200.64; 364/242.94; 707/10, 104; 709/234, 233, 231; 712/225

[56] References Cited

U.S. PATENT DOCUMENTS

| | | | |
|---|---|---|---|
| 5,375,068 | 12/1994 | Palmer et al. ...................... | 395/200.34 |
| 5,414,845 | 5/1995 | Behm et al. ............................ | 395/650 |
| 5,619,656 | 4/1997 | Graf .................................... | 395/200.11 |

FOREIGN PATENT DOCUMENTS

| | | |
|---|---|---|
| 0 553 549 | 4/1983 | European Pat. Off. . |
| 0 139 768 | 8/1985 | European Pat. Off. . |
| 0 201 065 | 12/1986 | European Pat. Off. . |
| 0 472 814 | 4/1992 | European Pat. Off. . |

OTHER PUBLICATIONS

IBM Technical Disclosure Bulletin, vol. 37, No. 6a, Jun. 1994, Method for the Conversion of Multimedia Streams to Packet Streams, pp. 95–98.

Elektronik Jun. 1992, Video MIT DEM Computer, Hentschke et al, pp. 76–81.

*Primary Examiner*—Thomas C. Lee
*Assistant Examiner*—Harold Kim
*Attorney, Agent, or Firm*—Hill & Simpson

[57] ABSTRACT

With the advent of multimedia in computer systems, it is necessary to integrate audio and video in the computer as data types equivalent to text and graphics. For this purpose, provision is made of program modules which carry out different tasks. In order to define the properties of each audio/video device, an endpoint module is generated for each audio/video device and then forms the interface to the remaining modules. When a data packet is to be transmitted from one device to another device, an event or a request is generated, which is evaluated by an event module, which then selects the corresponding endpoint modules and establishes a logical link between these endpoint modules. The data packet is controlled by means of a data module, which also initiates the storage of the data packet. Following termination of the transmission of the data packet, the event module searches for further requests which can, for example, be held in a queue in a waiting loop. The advantage is an upwardly hardware-neutral interface for the integrated management of the local audiovisual resources of the computer.

14 Claims, 4 Drawing Sheets

METHOD FOR SIMULTANEOUS DIGITAL PROCESSING OF A PLURALITY OF AUDIO VISUAL DATA PACKETS BY USING DATA, EVENT, PROTOCOL AND ENDPOINT MODULES

BACKGROUND OF THE INVENTION

With the advent of multimedia in computers, for the first time audio and video were integrated in the computer as data types equivalent to text and graphics, with the result that a multiplicity of currently available computers have audiovisual capabilities. However, audio and video functionality (A/V functionality) are generally separate from one another, and various use and programming interfaces exist on the different platforms. A scalable and upwardly hardware-neutral interface is required for the integrated management of the local audiovisual resources of the computer. Furthermore, distributed applications which are executable between computers, such as, for example, videoconferencing applications or video on demand applications, are acquiring more and more importance. For this reason, it is necessary to provide interfaces between the management of the local A/V resources and the exchange of the A/V data between computers.

SUMMARY OF THE INVENTION

The problem underlying the invention consists in specifying a method with which the disadvantages specified above are eliminated.

In general terms the present invention is a method for the simultaneous digital processing of a plurality of audio visual data packets to be transmitted from/to audio-video devices in a computer system. Information items concerning each audio/video device are combined as endpoint in a respective endpoint module. A data module controls the transport of the data packets between endpoints and initiates storage. The occurrence of events upon which a data traffic between endpoints is to be initiated is monitored by an event module. The setting up of endpoints as source and sink for the data packets and the logical interconnection of the endpoints are carried out by a protocol module.

Advantageous developments of the present invention are as follows.

The data exchange between endpoints which are assigned to different computers takes place via a network interface.

The modules form an audio/visual system. The access of a user to the system is controlled by an access unit.

The endpoint modules are managed with their information items as list entries in a field. The assigned device and its properties are contained as information per endpoint module and entry. An entry is selected by means of a keyword which specifies the endpoint module.

The operating mode, source and/or sink, in which the device assigned to an endpoint module is operated is stipulated in a transmission mode.

When a device is started, all the entries of the field are set to null and the transmission mode is switched off, in which device classes available at a computer are initialized by loading the entries with the specific parameters of the device classes and storing them. When a request or an event occurs, the assigned entry is selected by means of the keyword.

The protocol module, is realized as interface to the application and has two submodules. One submodule converts the enquiries sent by the user into a protocol-neutral format and the other submodule evaluates the enquiry and activates the modules which are responsible for the respective enquiry.

The second submodule can be assigned to a plurality of first submodules.

The event module monitors the interfaces of all the modules for the arrival of events. If a module has to wait for the arrival of an event, a file descriptor is generated for this event, which file descriptor is incorporated into an event queue. Upon arrival of the event, the corresponding module is activated and then receives the data. In the initialization phase, a list of descriptors is created for the event module, which list contains a keyword, a marking which shows whether the descriptor is to be used for reading or writing, the priority of the descriptor and a reference to the function which is to be executed upon the arrival of the event. In order to monitor an event, this descriptor is filled and is inserted into the descriptor list, in which the event module checks all the entries situated in the descriptor list with regard to the arrival of events. When such an event is registered, it executes the functions assigned in the descriptor list.

In the initialization phase, a descriptor for monitoring the protocol interface of the protocol module outwardly to the application is entered into the descriptor list and is the first to be executed by the event module.

The data module manages the data packets to be processed in the computer. When such a packet arrives at an endpoint module or at the network interface, the data module dynamically assigns the memory space and stores the data packets there.

It is stipulated in the data module that a data packet is deleted only when it is no longer required in the entire system.

The data module ensures that data packets are not duplicated in the system since only references to the data packets are forwarded to other components of the computer system.

The method to be described has the following advantages:

It permits the recording and playback of A/V data in a computer, the (de)coding and/or (de)compression of A/V data in real time, the transport of the (possibly synchronized) A/V data packets within the computer between different peripherals, such as for example, screen, backup memory, network adapter, and also the sending of A/V data to and/or the receiving of A/V data from other computing systems.

Access to this A/V system is made via a protocol interface which can be matched to the requirements of the application. The A/V system has a modular structure. This achieves a high degree of scalability and portability.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with accompanying drawings, in the several Figures of which like reference numerals identify like elements, and in which:

DESCRIPTION OF THE PREFERRED EMBODIMENTS

Figure 1:
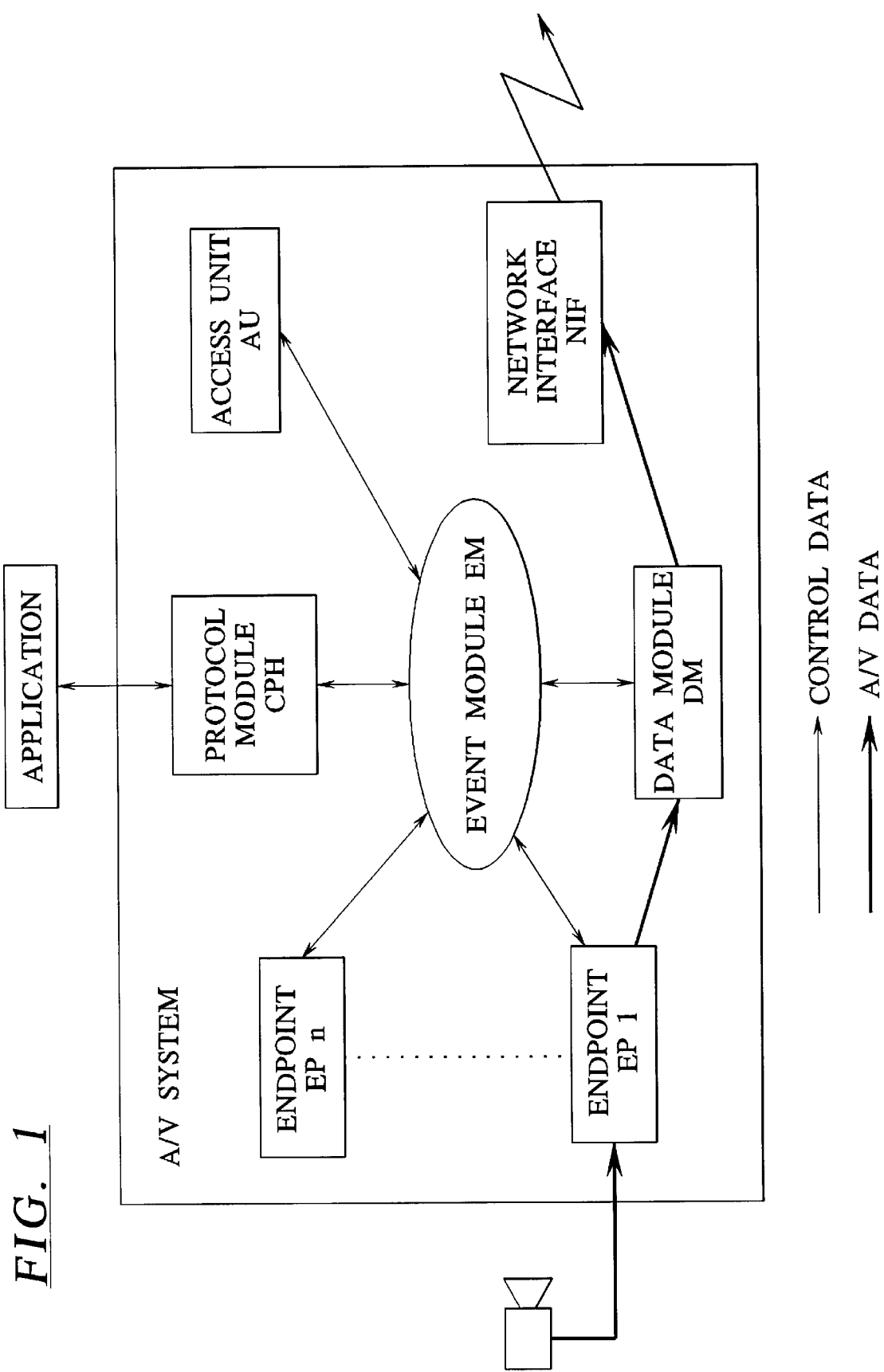
FIG. 1 shows the structure of the A/V software system.

The Architecture of the A/V System, FIG. 1

The A/V system encapsulates the audio/video hardware (devices) of the destination system (in other words the local input and output of the audiovisual data of the A/V system) in so-called endpoint modules (EP). Thus, for example, the endpoint module which manages the frame grabber card of the computer supplies the digitized data of the video camera via a uniform endpoint interface to the A/V system. Another endpoint module controls the output of the video data on the screen, and yet another could write the same data to a hard disk. Suitable endpoint modules can be configured freely depending on the A/V functionality supported on the destination system.

The exchange of the A/V data packets between computers takes place via a network interface (NIF).

A protocol module (CPH) serves as control interface for the A/V system. The setting up of sources and sinks on the local platform and the logical interconnection of sources and sinks, locally or between computers, are made possible by means of this interface. Sources and sinks in this case correspond to endpoints (in the local case), or access points in the network interface NIF (in the remote case).

The transport of A/V data packets between endpoints and/or the NIF is controlled by means of a data module (DM). This module realizes efficient flow control of the A/V data packets within the A/V system.

Access control to the A/V system can be effected by means of an access unit (AU). The authentication of the application takes place here.

The heart of the A/V system in an event module (EM). The event module EM monitors at which location and at which point in time events are present and activates the corresponding components. An example of such an event is the arrival of a protocol message, sent by the application, at the protocol module CPH. The event module EM thus serves exclusively for the control of the A/V system. It does not participate in the processing of the useful data within the A/V system.

The Endpoints and their Modules (EP)

The endpoints encapsulate the hardware-dependent parts of the A/V system. The endpoint modules necessary for this can be generated dynamically as required by a generic EP unit. Once the endpoints have been initialized as sources and sinks on account of the enquiry of an application, they can be logically interconnected. Links fundamentally exist from a source to one or else more sinks (unidirectional links). After the interconnection, it is possible to begin suitable A/V data transport from the source to the sinks. Possible endpoints may be, inter alia:

Endpoints for recording (digitizing) audio and video data via microphone and camera.

Endpoints for recording (digitizing) audio and video data via microphone and camera with simultaneous compression of the A/V data.

Endpoints for playing back audio and video data via loudspeaker and screen.

Endpoints for playing back audio and video data via loudspeaker and screen with simultaneous decompression of the A/V data.

Multiplex endpoints for synchronizing associated audio and video streams.

File endpoints for supporting different file systems (for example file systems for CD-ROM or hard disks, but also access to multimedia databases with specific file systems).

Provided that the underlying A/V hardware supports this, endpoints can be initialized and interconnected with one another in such a way that it is also possible to process a plurality of A/V data streams in parallel. These different A/V streams can be controlled by a plurality of applications. In the case of the compression endpoints, for example, it is also possible for a plurality to exist, which make it possible to use different compression methods simultaneously.

Information items concerning endpoints and their realization in a module are managed by means of a one-dimensional field structure (ep_id_ctrlblk[ ]), which can be indexed by means of endpoint ID keywords. Each of these field entries in turn contains information items on the respectively managed device class (ep_ctrlblk) as well as on the mode and status of the possible transmission of data (TransmissionMode, TransmissionState). The ep_ctrlblk has a list of all the devices which can be addressed via it. In this case, the list elements are, in terms of the structure, uniform control blocks (dev_c-trlblk), which permit access to the specific properties of the device described by them. Device control blocks contain information items such as:

Type designation of the device
Status of the device (OPENED/CLOSED).
References to device-specific routines for
   opening the device
   closing the device
   interrogating the device properties (for example compression method, resolution, . . . )
   reading/writing of data from/to the device The TransmissionMode stipulates whether the device is operated only for audio, only for video or in an interleaved A/V mode.

The TransmissionState indicates whether data are currently being transmitted from or to the managed device.

When the local A/V component is started, for all of the ep_id_ctrlblk field entries (for example 16) the ep_ctrlblk is set to NULL and the TransmissionState to OFF. In a second step, the A/V device classes available at this computer (for example device for recording audio, device for playing back audio) are initialized by loading the (in the example two) ep_ctrlblk structures with the specific parameters (in other words dev_ctrlblk). These structures are then stored in the ep_id_ctrlblk[ ] field.

In this way, the endpoints are initialized and can be used in the further sequence in accordance with the incoming requests (for example enquiry regarding the capabilities of the endpoints, opening source/sink, interconnecting source/sink, etc.). The data structures of the individual endpoints are dynamically updated as required. In their entirety, the endpoints to be managed are seen by the other modules as one EP unit.

The Protocol Module CPH

The protocol module CPH realizes the interface to the application. It is subdivided into two layers, the first submodule (PA) and the second submodule (PH). A PH can be connected to different PAs, which in turn realize different communication mechanisms. PAs can be for remote procedure call protocols and the remote operation service protocol of the ISO (ISODE-ROSE). Also conceivable here are the RPC mechanism of the distributed computing environment (DCE-RPC) of the OSF or simple call interfaces for exclusively locally executable applications.

After the PA has converted the enquiries transmitted by the application into a protocol-neutral format, the PH evaluates the enquiries and activates (via the event module) the modules in the A/V system which are responsible for the respective enquiry (for example the access unit if an application wants to log on to the A/V system). The protocol module CPH also sends results of the enquiries, error messages and information items concerning specific events which have occurred in the A/V system and about which the application warts to be informed.

The protocol-dependent PA offers the protocol-independent PH basic functions by means of which the latter can establish and manage client/server relations between two communicating modules (for example application and A/V system). These are:

Init_PA: The PH is initialized as server by means of this function. Init_PA is used by the PH of the A/V system.

GetFds_PA: This function supplies a file descriptor which indicates whether there is an enquiry present at the server. GetFds_PA is used by the PH of the A/V system.

Activity PA: An existing enquiry from the PA is collected by means of this function. The enquiry is now present in a protocol-neutral format, that is to say the format has been converted beforehand by the PA. Activity_PA is used by the PH of the A/V system. GetFds_PA and Activity_PA are necessary in order that the A/V system is not blocked as long as there are no enquiries present at the A/V system.

Connect_PA: The PH is initialized as client by means of this function. Connect_PA is used by the PH of the application.

DisConn_PA: The PH is logged off as client by means of this function. DisConn_PA is used by the PH of the application.

The conversion of the protocol formats in the PA is a mapping of the protocol-specific data structures to generic data structures for the PH.

Figure 2:
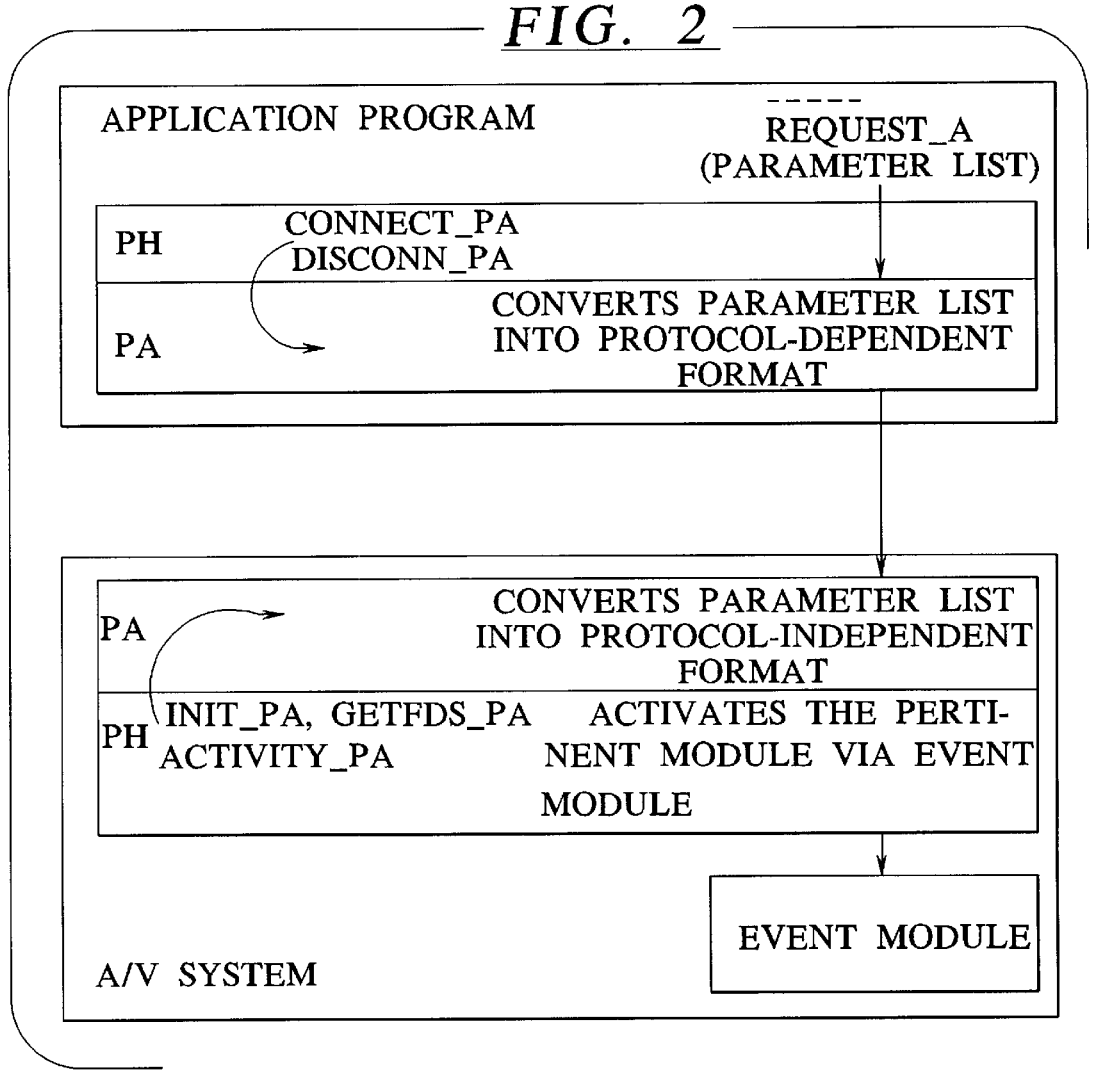
FIG. 2 shows the method of functioning of a module, the protocol module.

FIG. 2 explains the mechanism described.

The Event Module EM

The event module is the heart of the A/V system. It is responsible for managing the sequences within the A/V system, that it to say it switches over the "handling sequence" between the modules within the A/V system as required. It is thus able to ensure, even on computers which do not have a real-time operating system, compliance with the temporal conditions necessary for processing continuous media (these include audiovisual media).

The EM monitors the interfaces of all the A/V system modules to peripherals for the arrival of events. If a module has to wait for the arrival of an event (for example an EP for a signal from the audio hardware that a new data block is available), then a descriptor is created for this event, which descriptor can then be incorporated into the event queue of the EM. Upon arrival of the event, the corresponding endpoint is activated and then receives the data. After termination of this action, control over the A/V system is given back to the EM, which can then react to the next event in its queue. Data are not transported via the EM. Direct transport between the relevant modules takes place here.

In the initialization phase of the A/V system an (initially empty) list of file descriptors is created for the EM. The structure of these file descriptors contains:

File-Descriptor ID: This number is obtained by a device-specific call to the device to be monitored, with the purpose of enabling the operating system to receive events which the device wants to report.

Marking which shows whether this file descriptor is used for reading or writing.

Priority of the file descriptor.

Reference to the function which is to be executed upon the arrival of an event which relates to this file descriptor.

If it is intended to generate a file descriptor for monitoring a specific event, then the structure described above is filled and inserted into the list of file descriptors. The heart of the EM is an endless loop, which checks all the elements situated in the file descriptor list with regard to the arrival of events. If such an event has been registered, the function referenced in the file descriptor structure is executed (select mechanism). If a plurality of events are present, the event having the highest priority is selected in accordance with the priority field of the file descriptor structure, and the associated function is activated. Following termination of the activity of the called-up function, program control passes back to the EM, which checks anew all the elements of the file descriptor list for events which have arrived in the meantime. The very first structure which is entered into the file descriptor list after the initialization phase of the A/V system is a file descriptor element for monitoring the protocol interface of the CPH outwardly to the applications. The A/V system thus "eavesdrops" on its interface to the application. If an enquiry of an application arrives, then "the A/V system wakes up", and further file descriptor elements are entered into the file descriptor list depending on the sequence of the dialog.

The Data Module

The data module manages the A/V data packets to be processed locally in the computer. When such a packet arrives at an EP or at the NIF (sent from another computer), memory space is dynamically allocated and the A/V data are then stored there. Only when it is ensured that such a packet is no longer required in the entire A/V system is the memory space cleared by the DM. The DM also ensures that A/V data are not duplicated in the A/V system, in that it forwards only references to the packets to other components of the A/V system.

Figure 3:
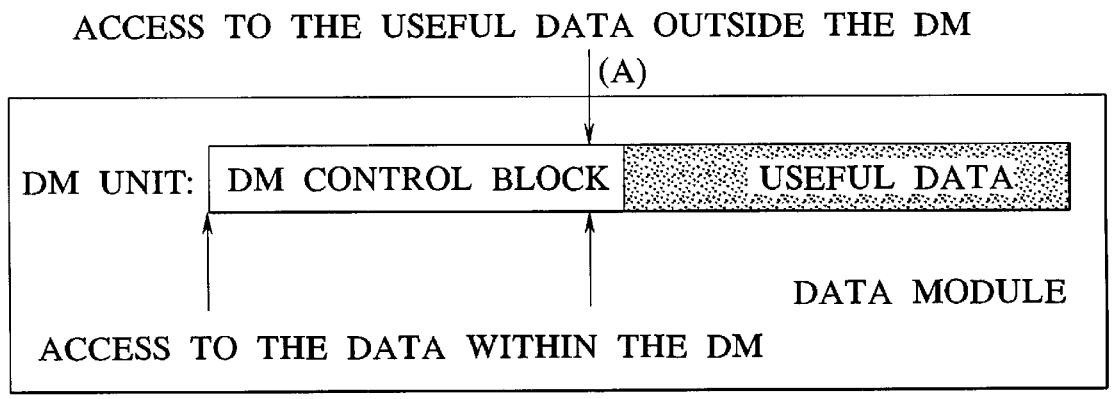
FIG. 3 shows the structure of a data unit.

If useful data (for example audio data or video data) are to be stored in the A/V system, then the memory space required therefor is allocated in the data module by means of the function dm_alloc. In this case, the DM allocates, in addition to the memory space for the useful data, a control block which adjoins this memory unit and contains information on the respective useful data unit. This control block is invisible outside the DM. Useful data and control block together form a DM unit. FIG. 3 describes this mechanism.

The control block comprises the following structural elements:

useful data type (AUDIO/VIDEO/NOAV)

length of the useful data block within the DM unit counter for the number of modules (for examples EPs, NIF) which still require this DM unit reference to a function by means of which useful data-specific clearing of the data is possible.

If a module clears a DM unit, then a check is made, using the counter, to see whether further modules are interested in this DM unit (counter>1) and the counter is, if appropriate, "decremented". If this is not the case, then the useful data part is first cleared by means of the useful data-specific clear function and the DM unit is then cleared by the data module. The DM furthermore offers functions by means of which the useful data part of a DM unit can be read and/or written to with A/V data. Only references to the useful data (marking A in the figure) are managed within the A/V system, with the result that the writing of the useful data to the DM unit only has to occur once.

For data which arrive from the network or data which pass to the network, there are available in the DM writing and reading functions which convert the useful data, independently of the platform used, into network byte ordering (in other words big endian format) or convert the useful data from network byte ordering into the endian format supported by the local machine.

The Network Interface NIF

The network interface is (with regard to the A/V data) the access point to/from other computers. The NIF is a special endpoint which encapsulates the functionality of network access. If, for example, it is recognized in the CPH that a request, which has arrived from the application, for the interconnection of a local source to a sink cannot be executed locally, since the sink is situated on a different computer, then corresponding access to this computer is set up via the NIF. The NIF can support any desired network transport systems (TCP/IP, UDP/IP, . . . ) and network infrastructures (Ethernet, FDDI, ISDN, . . . ) in a transparent manner to the remaining A/V system components.

Like the endpoints specific to the A/V devices, the NIF is addressed via the EP unit. When an I/O port is opened to the network, an NIF control block is created within the NIF in addition to the (network and transport protocol-dependent) setting up of the port, which NIF control block contains the EP ID, the type of connection (connection-oriented/ connectionless) and the data type (audio/video). The monitoring of the port with regard to incoming data is done by means of the EM. The port is outwardly addressed with the aid of the associated EP ID by means of reading and writing functions.

The Access Unit AU

Applications can log on to the A/V system or (prior to the termination of the application itself) log off via the access unit. An access list is kept within the AU, which list contains information items concerning the applications currently registered with the AU. If an enquiry relating to the registering of an application arrives at the local A/V system, then the AU checks whether the application is authorized to use the A/V component (for example password check, protocol version, etc.). Authorized applications are then entered in the access list if they are not yet kept therein. Depending on the result of the check, the application receives in return either an error message or an identification number. In the event of subsequent enquiries on the part of the application to the A/V system, the AU can check in the access list, using the identification number, to see whether or not the application is authorized for this enquiry. When the application logs off, the corresponding entry in the access list is deleted.

Figure 4:
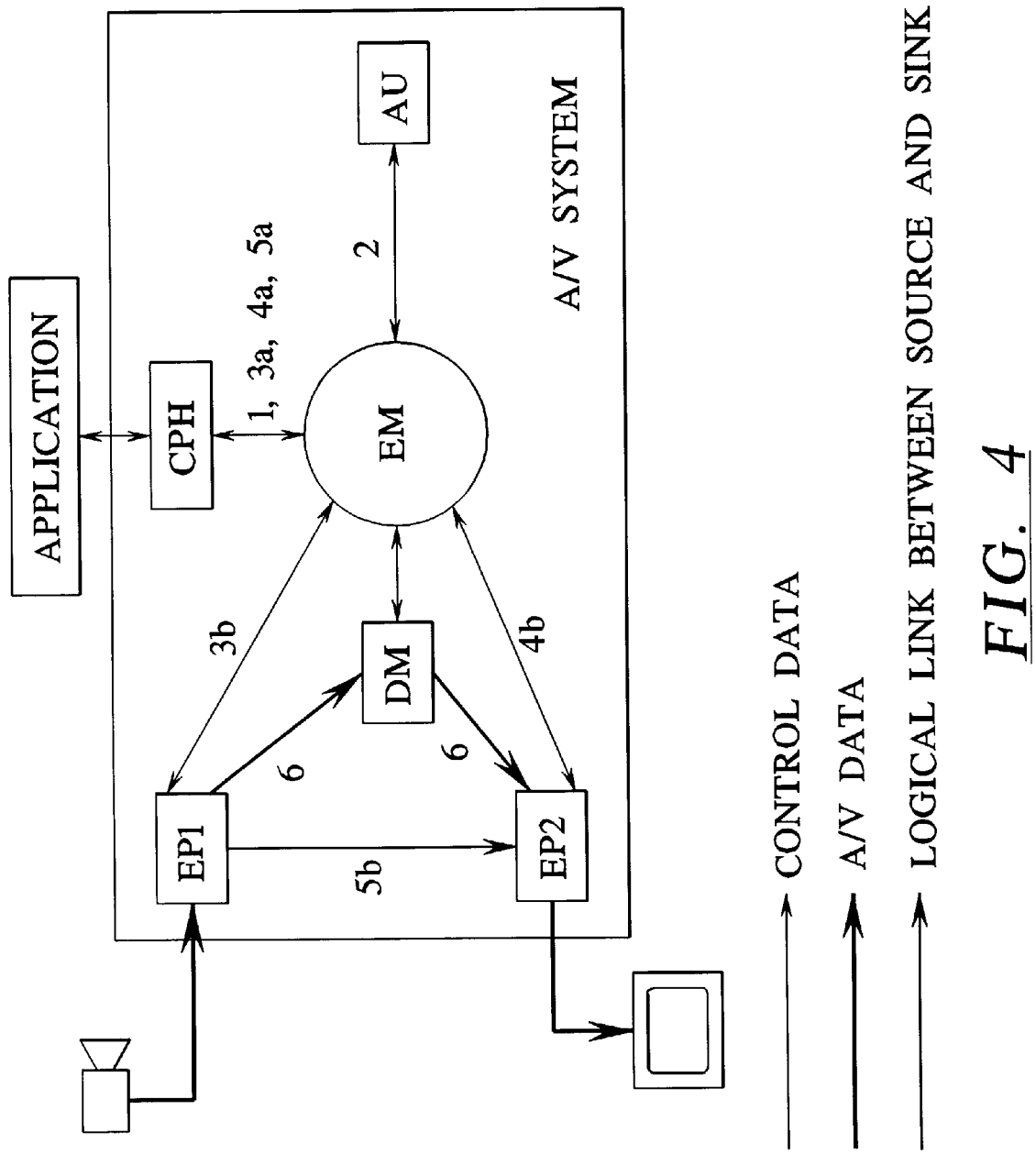
FIG. 4 shows a first sequence example.

Exemplary Sequence for use of the A/V System, FIG. 4

It is described how picture sequences recorded by means of the video camera can be displayed locally on the same computer.
1. Application logs on via CPH
2. Authentication via AU
3. Opening of the camera endpoint EP1 as source (3b) via CPH, (3a)
4. Opening of the video playback endpoint EP2 as sink (4b) via CPH (4a)
5. Logical interconnection of the endpoints (5b) via CPH (5a)
6. Transport of the A/V data via DM between EP1 and EP2

Note: In all these actions, the EM is also involved as central system control station.

Figure 5:
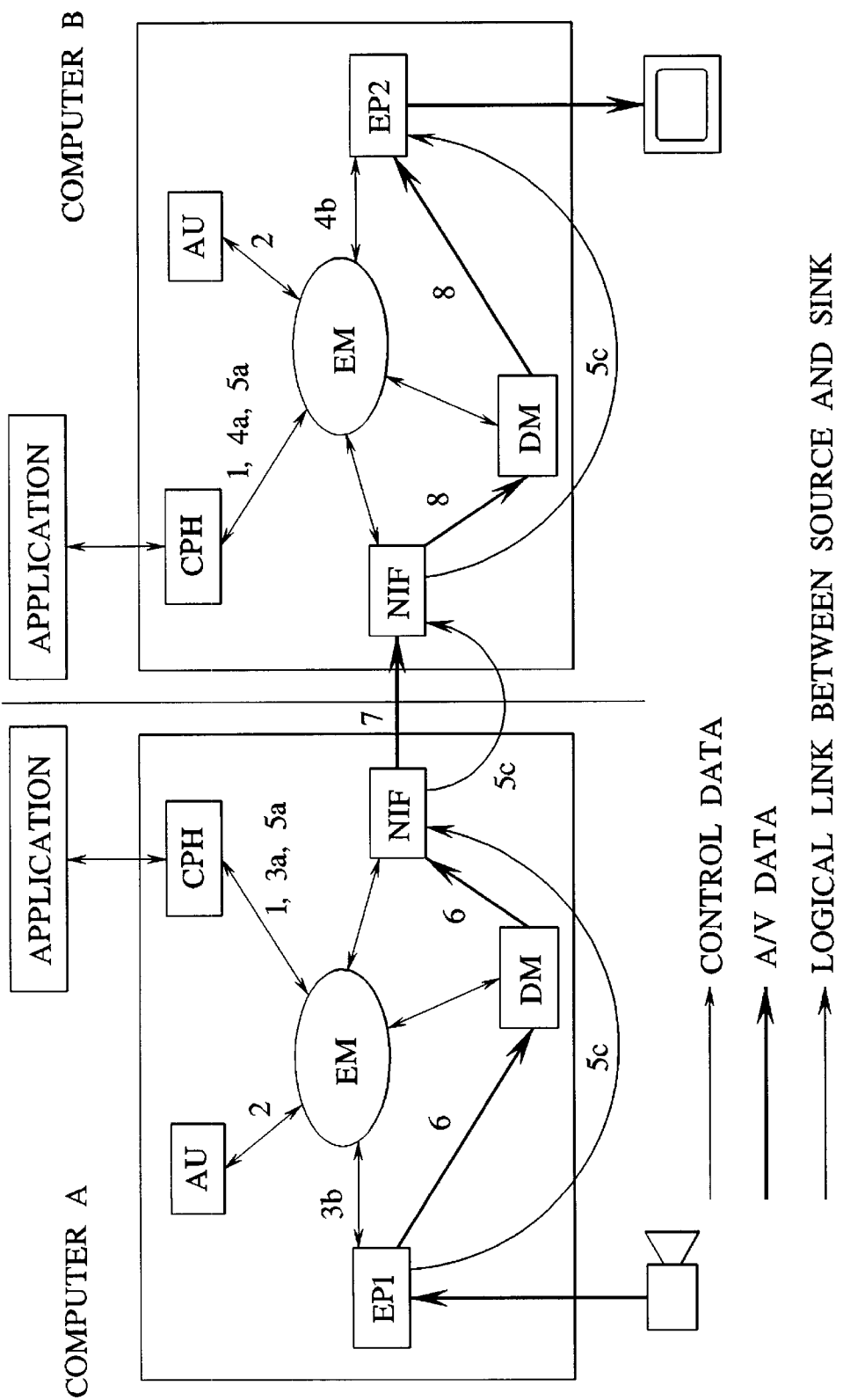
FIG. 5 shows a second sequence example.

Use Between Two Computers, FIG. 5

In a manner analogous to 4.1, the case is illustrated when the source and sink are situated on different computers.
1. Application logs on via CPH of both computers
2. Authentication via AU of both computers
3. Opening of the camera endpoint EP1 as source (3b) via CPH (3a) on computer A 4. Opening of the video playback endpoint EP2 as sink (4b) via CPH (4a) on computer B
5. Logical interconnection of the endpoint (5b) via CPH (5a) and NIF (5c) of the computers A and B
6. Transport of the A/V data via DM between EP1 and NIF of the computer A
7. Sending of the A/V data from the NIF of the computer A to the NIF of the computer B
8. Transport of the A/V data via DM between NIF and EP2 of the computer B Note: In all these actions, the EM is also involved as central system control station.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for simultaneous digital processing of a plurality of audio visual data packets to be transmitted from/to audio/video devices in a computer system, comprising the steps of:

combining information items concerning each audio/ video device as endpoint in a respective endpoint module;

controlling via a data module transport of data packets between endpoints and initiates storage thereof via the data module;

monitoring by an event module occurrence of events upon which a data traffic between endpoints is to be initiated;

setting up endpoints as source and sink for the data packets and setting up logical interconnection of the endpoints by a protocol module.

2. The method as claimed in claim 1, wherein data exchange between endpoints which are assigned to different computers takes place via a network interface.

3. The method as claimed in claim 1, wherein the data, event and protocol modules form an audio/visual system, and wherein access of a user to the system is controlled by an access unit.

4. The method as claimed in claim 1, wherein the endpoint modules are managed with their information items as list entries in a field, wherein an assigned device and properties thereof are contained as information per endpoint module and entry, and wherein an entry is selected by a keyword which specifies the endpoint module.

5. The method as claimed in claim 4, wherein an operating mode, source and/or sink, in which the device assigned to an endpoint module is operated is stipulated in a transmission mode.

6. The method as claimed in claim 5, wherein when a device is initiated, all the entries of the field are set to null and the transmission mode is switched off, in which device classes available at a computer are initialized by loading the entries with specific parameters of device classes and storing the device classes, and wherein, when a request or an event occurs, the assigned entry is selected by the keyword.

7. The method as claimed in claim 1, wherein the protocol module, is realized as interface to an application and comprises two submodules, of which one submodule converts enquiries sent by a user into a protocol-neutral format and the other submodule evaluates the enquiry and activates modules which are responsible for the respective enquiry.

8. The method as claimed in claim 7, wherein a second submodule is assignable to a plurality of first submodules.

9. The method as claimed in claim 1, wherein the event module monitors interfaces of all the modules for arrival of events, wherein, if a module has to wait for the arrival of an event, a file descriptor is generated for this event, which file descriptor is incorporated into an event queue, wherein, upon arrival of the event, a corresponding module is activated and then receives data.

10. The method as claimed in claim 9, wherein, in an initialization phase, a list of descriptors is created for the event module, which list contains a keyword, a marking which shows whether the descriptor is to be used for reading or writing, a priority of the descriptor and a reference to a function which is to be executed upon the arrival of the event, in which, in order to monitor an event, this descriptor is filled and is inserted into the descriptor list, in which the event module checks all the entries situated in the descriptor list with regard to the arrival of events and, when such an event is registered, executes the functions assigned in the descriptor list.

11. The method as claimed in claim 10, wherein, in the initialization phase, a descriptor for monitoring the protocol interface of the protocol module, external to the application, is entered into the descriptor list and is first to be executed by the event module.

12. The method as claimed in claim 1, wherein the data module manages data packets to be processed in the computer and, when such a packet arrives at an endpoint module or at the network interface, the data module dynamically assigns memory space and stores the data packets in the memory space.

13. The method as claimed in claim 12, wherein in the data module a data packet is deleted only when said data packet is no longer required in the entire system.

14. The method as claimed in claim 13, wherein the data module ensures that data packets are not duplicated in the system since only references to the data packets are forwarded to other components of the computer system.

* * * * *